United States Patent [19]
Hong

[11] Patent Number: 5,927,091
[45] Date of Patent: Jul. 27, 1999

[54] DUAL-PURPOSE REFRIGERATOR FOR USE ON AN AUTOMOBILE

[76] Inventor: Wen-Hu Hong, 2nd Floor, No. 98 Ming Shen E.Road, Sec. 5, Taipei, Taiwan

[21] Appl. No.: 09/113,191

[22] Filed: Jul. 10, 1998

[51] Int. Cl.⁶ .............................. B60H 1/32; F25B 29/00
[52] U.S. Cl. ............................ 62/244; 62/239; 62/323.1; 165/61
[58] Field of Search .................... 62/239, 244, 323.1, 62/331; 165/61

[56] References Cited

U.S. PATENT DOCUMENTS

| | | | |
|---|---|---|---|
| 4,637,222 | 1/1987 | Fujiwara et al. | 62/244 |
| 5,203,833 | 4/1993 | Howell | 165/41 |
| 5,289,698 | 3/1994 | Garimella | 62/498 |
| 5,660,051 | 8/1997 | Sakakibara et al. | 62/133 |
| 5,701,754 | 12/1997 | Choi et al. | 62/244 |
| 5,819,541 | 10/1998 | Turfkel et al. | 62/5 |

FOREIGN PATENT DOCUMENTS

| | | | |
|---|---|---|---|
| 36009239 | 5/1985 | Japan | 62/239 |
| 0063410 | 3/1989 | Japan | 62/239 |

Primary Examiner—Henry Bennett
Assistant Examiner—Melvin Jones
Attorney, Agent, or Firm—Dougherty & Troxell

[57] ABSTRACT

Disclosed is a dual-purpose refrigerator for use on an automobile mainly including a housing having an inner container therein. The inner container has a flat-type circulating pipe spirally wound about its upper outer surface and a closed water chamber formed at a lower part thereof. Two pipes extend from two ends of the circulating pipe to an air-conditioning compressor of the automobile via a multi-way flow control valve, and two pipes extend from the water chamber to an engine radiator of the automobile via the same multi-way flow control valve. The multi-way flow control valve is supplied with current to either open the pipes communicating the circulating pipe and the air-conditioning compressor for cool air from the compressor to flow into the circulating pipe to refrigerate the inner container, or open the pipes communicating the water chamber and the engine radiator for hot water from the engine radiator to flow into said water chamber to heat the inner container. A spout and a pumping device may be provided to the refrigerator to conveniently supply cold or hot water stored in an upper part of the inner container for drinking.

10 Claims, 5 Drawing Sheets

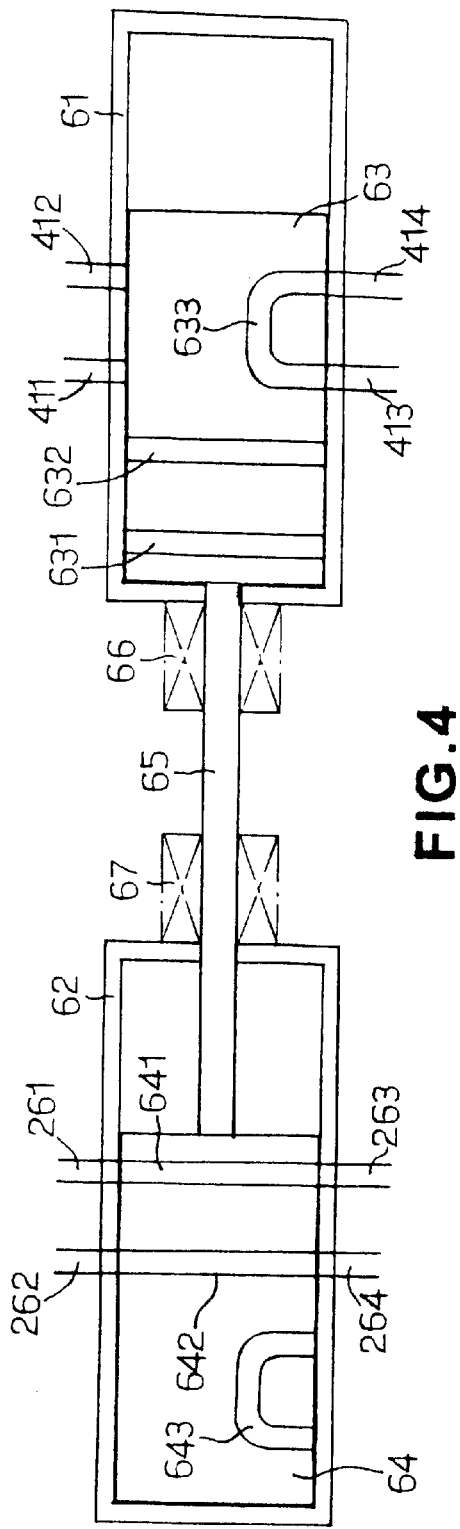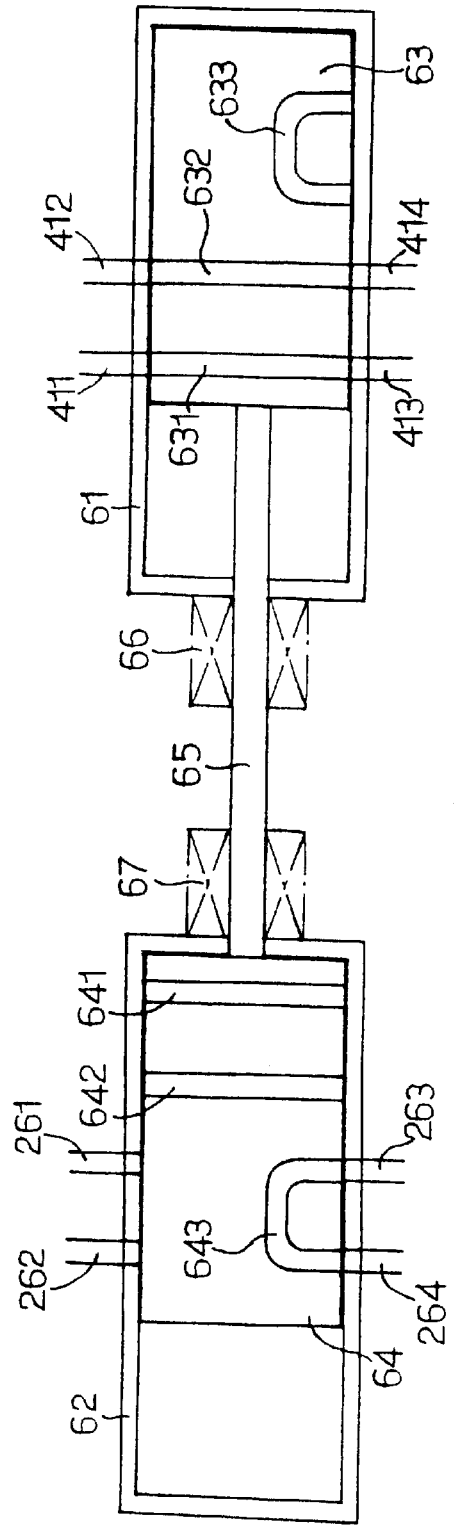

DUAL-PURPOSE REFRIGERATOR FOR USE ON AN AUTOMOBILE

BACKGROUND OF THE INVENTION

In Taiwan Utility Model Patent No. 97876 (Application No. 82212443) granted to the inventor, there is disclosed a warmer and refrigerator for use on automobiles that includes a cabinet basically made of insulating material. As shown in FIG. 1, the cabinet defines an inner space, a middle partition which dividing the inner space into two smaller spaces for separately forming a warmer and a refrigerator, and two top covers for separately closing the warmer and the refrigerator. The cabinet and the top covers may be finished with decorative materials, such as grained veneer, to create visual beauty and good texture. The warmer includes a hot chamber formed from thermal conductive metal material to accommodate a first inner container that is surrounded by a first hollow annular water storage. A water inlet pipe and a water outlet pipe extend from the first water storage to the cooling water circulating pipe system of the engine radiator of the automobile, so that cooling water passing by and heated by the engine is guided into or out the first water storage to warm up the first inner container. The refrigerator includes a cold chamber also formed from thermal conductive metal material to accommodate a second inner container that is surrounded by a second hollow annular water storage. A condensing pipe is spirally wound about the second inner container. A coolant inlet pipe and a coolant outlet pipe extend from the second water storage to the coolant pipe of the air-conditioning system of the automobile, so that cooling effect obtained from the phase change of the coolant in the coolant pipe can be extended into the condensing pipe wound about the second water storage to refrigerating the second inner container.

In brief, the above-described structure includes a warmer which has a hot chamber using hot water from an engine radiator of an automobile to keep an interior of the hot chamber at a suitable high temperature and a refrigerator which has a cold chamber being wound by extended coolant pipe of the air-conditioning system of the automobile to keep an interior of the cold chamber at a suitable low temperature. Whereby, food, drink, towels, etc. can be stored in the warmer or the refrigerator on the automobile for use by a driver and passengers on the automobile at any time while travelling.

Following drawbacks are found in the warmer and refrigerator for use on automobiles disclosed in Taiwan Patent No. 97876 and require improvement:

1. The warmer and the refrigerator are basically two spaces in an insulating cabinet separated from one another by a middle partition to each contain an inner container. To wind pipes about the inner containers for heating or refrigerating purpose, it is necessary to reduce usable spaces in the inner containers. Thus, only limit amount of cold or hot foods, drinks, or towels can be stored in the warmer or the refrigerator. That is, the warmer and the refrigerator disclosed in Taiwan Patent No. 97876 actually provide only very small usable storage rooms.

2. The water inlet and outlet pipes and the coolant inlet and outlet pipes are wound about inner containers of the hot chamber and the cold chamber, respectively, to form discrete single-pipe spiral passages. After these single-pipe spiral passages are formed around the inner containers, they are further connected to the air-conditioning system and the engine radiator via other pipelines. That is, total two times of pipe winding and connection are required in each cabinet holding the warmer and the refrigerator. In addition to the time and high cost for winding and connecting the pipes, other disadvantages, such as inconvenience in manufacture, too much space occupied by the pipes, and higher material cost for the pipes, are also found in the disclosure of Taiwan Patent No. 97876.

3. It is very possible that only the warmer or the refrigerator in the cabinet is utilized in different seasons or occasions. For example, the warmer is more frequently used in winter while the refrigerator in summer. The unutilized warmer or refrigerator is apparently an unnecessary waste in terms of energy saving. Moreover, there are not any water circulating control means provided on the pipelines. Water or coolant keeps flowing through the spiral pipeline of the unutilized warmer or the refrigerator and forms another waste of energy.

SUMMARY OF THE INVENTION

It is therefore a primary object of the present invention to provide a dual-purpose refrigerator for use on an automobile. Cool air produced by the air-conditioning system and heated engine cooling water of the automobile are respectively guided into a flat circulating pipe spirally wound about an inner container of the refrigerator and a water chamber at a lower part of the same inner container. Pipes for guiding the cool air and the heated cooling water are led and connected to a multi-way flow control valve, so that the open or close of the cool air and heated cooling water pipes to the flat circulating pipe and the lower water chamber, respectively, can be controlled through the multi-way flow control valve according to actual need. When the cool air pipes are opened, cool air flows into the circulating pipe to refrigerate the inner container, and when the heated cooling water pipes are opened, hot water flows into the lower water chamber for the refrigerator to serve as a warmer.

BRIEF DESCRIPTION OF THE DRAWINGS

A more complete understanding of these and other features and advantages of the present invention will become apparent from a careful consideration of the following detailed description of certain embodiments illustrated in the accompanying drawings, wherein:

FIG. 4 illustrates the operation of the multi-way flow control valve of the present invention for the present invention to serve as a warmer;

FIG. 5 illustrates the operation of the multi-way flow control valve of the present invention for the present invention to serve as a refrigerator.

DETAILED DESCRIPTION OF THE PREFERRED EMBODIMENTS

Figure 1:
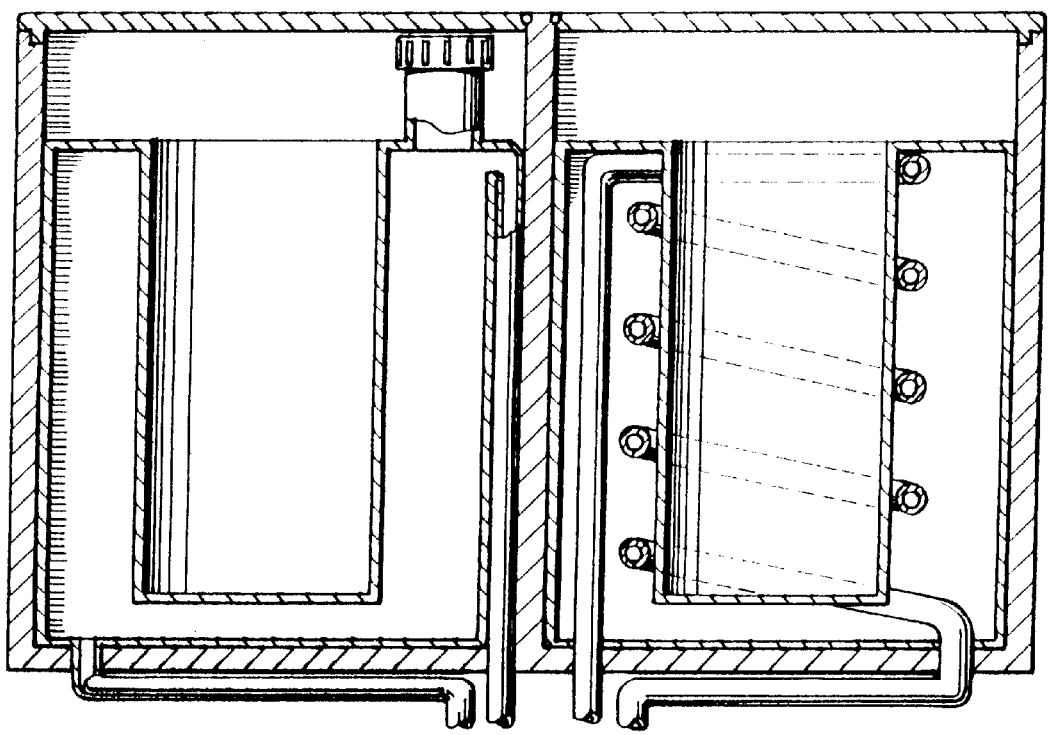
FIG. 1 illustrates the structure of the "warmer and refrigerator for use on automobiles" disclosed in an earlier patent granted to the inventor.
Figure 2:
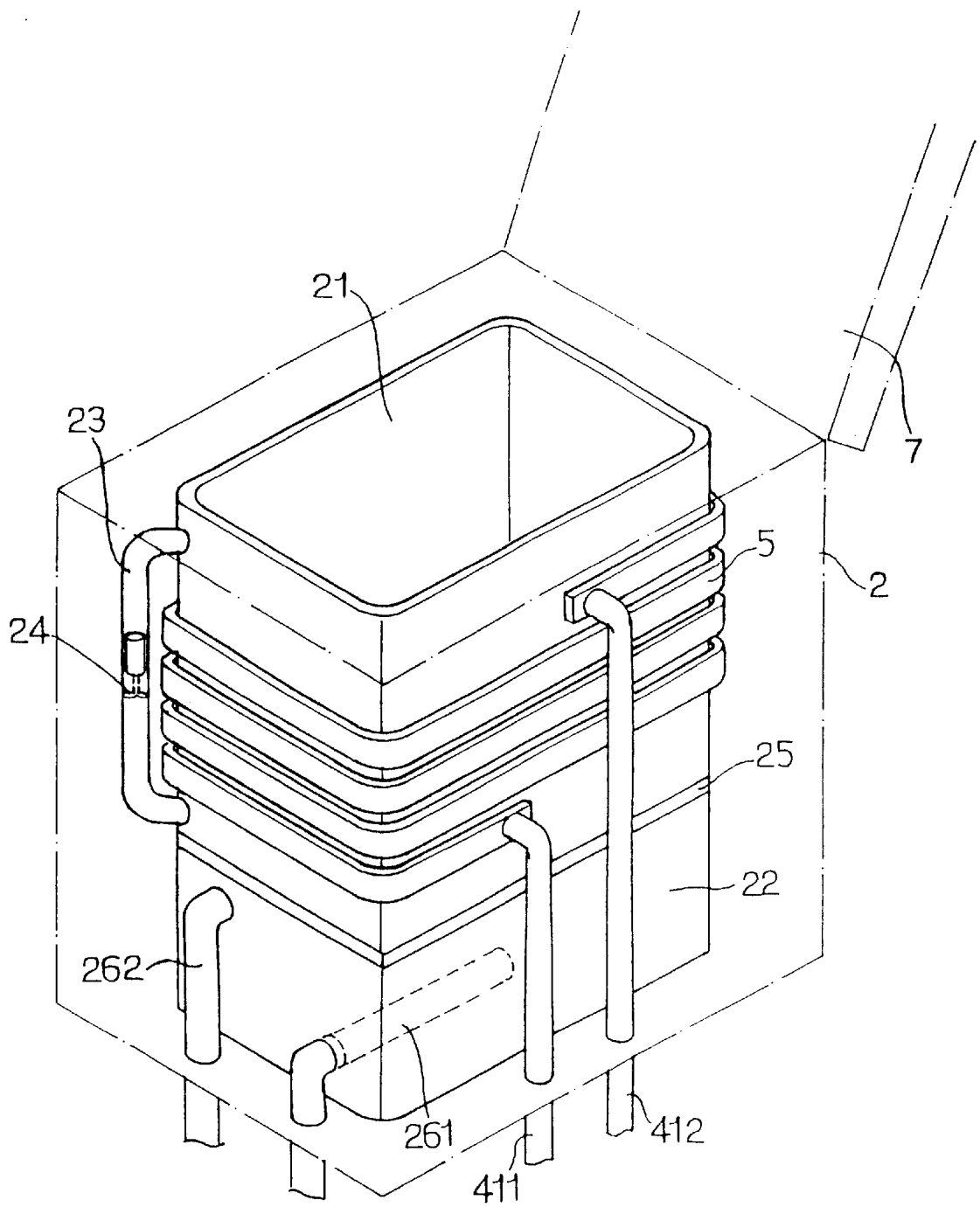
FIG. 2 illustrates the structure of a "dual-purpose refrigerator for use on an automobile" according to the present invention.
Figure 3:
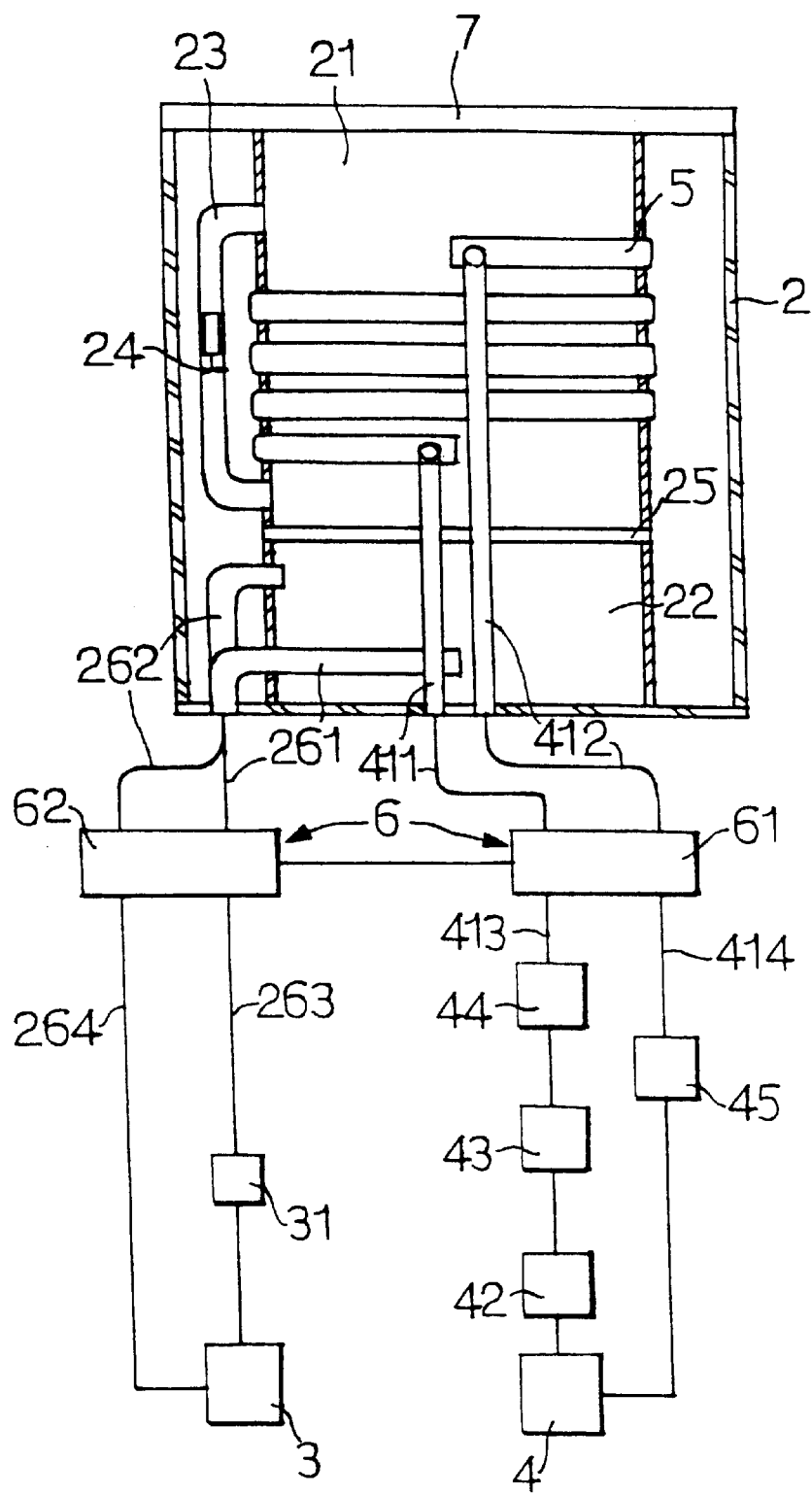
FIG. 3 illustrates the heating and refrigerating circulation systems of the present invention.

Please refer to FIGS. 2 and 3. The present invention relates to a dual-purpose refrigerator for use on an automobile. The refrigerator mainly includes a housing 2 indirectly connected to an engine radiator 3 and an air-conditioning system compressor 4 of the automobile via pipelines. There is a suitably sized inner container 21 in the housing 2. A flat-type circulating pipe 5 is spirally wound about outer surface of an upper part of the inner container 21. Lower and upper ends of the circulating pipe 5 respectively have a cool air inlet pipe 411 and a cool air outlet pipe 412 connected thereto. The cool air inlet pipe 411 and the cool air outlet pipe 412 are connected at another end to a multi-way flow control valve 6. A cool air guiding-in pipe 413 and a cool air guiding-out pipe 414 extend from the compressor 4 to the multi-way flow control valve 6 to correspond to the cool air inlet and outlet pipes 411, 412. A condenser 42, a receptor 43, and an expansion valve 44 are connected to the cool air guiding-in pipe 413 between the compressor 4 and the multi-way flow control valve 6, so that cool air obtained through the phase change of liquid coolant of the air-conditioning system of the automobile may flow through the cool air guiding-in pipe 413, the valve 6, and the cool air inlet pipe 411 and into the flat-type circulating pipe 5 to refrigerate items stored in the inner container 21. The cool air then flows through the circulating pipe 5, the cool air outlet pipe 412 and the valve 6, and into the cool air guiding-out pipe 414. An evaporator 45 is connected to the cool air guiding-out pipe 414. Cool air passes the evaporator 45 and returns to the compressor 4 to complete one cycle of cooling process. The flat-type circulating pipe 5 allows increased contact area between the pipe 5 and the outer surface of the inner container 21 and therefore produces increased thermal conductive area and enhanced efficiency of thermal conduction.

To enable the inner container 21 to maintain a constant low temperature in a quick and uniform manner, a circulating conduit 23 and a fan 24 are particularly mounted in a space between the housing 2 and the inner container 21 at a selected position, so that cool or hot air in the housing 2 may circulate more quickly to refrigerate or warm the items stored in the inner container 21 at a constant temperature. And, to save power consumption, a temperature control switch (not shown) may be provided in the inner container 21. A user may set the switch to a desired temperature at which the fan 24 shall automatically stop to save energy.

As shown in FIG. 3, a partition 25 is provided at a lower portion in the inner container 21 to form a hollow chamber 22 in the inner container 21 below the partition 25. A hot water inlet pipe 261 and a hot water outlet pipe 262 extend from a lower portion and an upper portion, respectively, of the chamber 22 to the multi-way flow control valve 6. A hot water guiding-in pipe 263 and a hot water guiding-out pipe 264 extend from a radiator of the engine 3 to another end of the multi-way flow control valve 6 opposite to the hot water inlet and outlet pipes 261, 262, respectively. A hot water circulating pump 31 is provided on the hot water guiding-in pipe 263 to directly pump hot water from the engine radiator 3 into the chamber 22, so that hot water enters the chamber 22 via the shortest path possible to ensure quick heating of the inner container to a high temperature. The hot water inlet pipe 261 has an extended length inside the chamber 22 that enables the formation of a swirling flow in the chamber 22 to achieve even and balanced diffusion of heat in the water to the whole inner container 21. The swirling water flow is guided out the chamber 22 via the hot water guiding-out pipe 264 to the engine radiator 3 and complete one cycle of the heating process.

Please now refer to FIGS. 4 and 5. The multi-way flow control valve 6 consists of two opposite multi-way valve bodies, that is, one cool air electromagnetic valve 61 and one hot water electromagnetic valve 62. The cool air electromagnetic valve 61 is provided at suitable positions on the valve body with multiple ports to connect the cool air inlet, outlet pipes 411, 412 and the cool air guiding-in, guiding-out pipes 413, 414. A sliding block 63 is provided in the valve body 61. Two straight tubes 631, 632 and a U-tube 633 are provided in the sliding block 63 in such a manner that either the two straight tubes 631, 632 or the U-tube 633 will be in alignment and communicating with the cool air guiding-in and guiding-out pipes 413, 414 when the sliding block 63 slides in the valve body 61.

Similarly, the hot water electromagnetic valve 62 is provided at suitable positions on the valve body with multiple ports to connect the hot water inlet and outlet pipes 261, 262 and the hot water guiding-in and guiding-out pipes 263, 264. A sliding block 64 is provided in the valve body 62. Two straight tubes 641, 642 and a U-tube 643 are provided in the sliding block 64 in such a manner that either the two straight tubes 641, 642 or the U-tube 643 will be in alignment and communicating with the hot water guiding-in and guiding-out pipes 263, 264 when the sliding block 64 slides in the valve body 62.

A connecting stem 65 extends between and into the cool air electromagnetic valve 61 and the hot water electromagnetic valve 62 with its two ends separately connected to the sliding blocks 63 and 64, so that the sliding blocks 63 and 64 sideward move synchronously along with the connecting stem 65. A cool air coil 66 and a hot water coil 67 are provided around the connecting stem 65 at positions outside and close to the valves 61 and 62, respectively.

When the coil 66 is supplied with a current, the connecting stem 65 is magnetically moved toward the cool air electromagnetic valve 61, as shown in FIG. 5, and brings the sliding block 63 to a position at where the two straight tubes 631, 632 in the sliding block 63 respectively align their one end with the cool air inlet pipe 411 and the cool air outlet pipe 412 and their another end with the cool air guiding-in pipe 413 and the cool air guiding-out pipe 414 and thereby communicate the cool air guiding-in pipe 413 with the cool air inlet pipe 411 and the cool air guiding-out pipe 414 with the cool air outlet pipe 412. Whereby, cool air from the air-conditioning compressor 4 may flow through the cool air guiding-in pipe 413, the straight tube 631, and the cool air inlet pipe 411, and into the flat-type circulating pipe 5 winding about the inner container 21 in the housing 2. Cool air in the flat circulating pipe 5 refrigerates the inner container 21 for the latter to function like a refrigerator. And, cool air flowing through the flat circulating pipe 5 shall pass the cool air outlet pipe 412, the straight tube 632, the cool air guiding-out pipe 414 and the evaporator 45 connected to the pipe 414, and returns to the compressor 4 to complete one cycle of refrigerating process.

When the connecting stem 65 is moved toward the cool air electromagnetic valve 61, the U-tube 643 in the sliding block 64 of the hot water electromagnetic valve 62 align its two ends with the hot water guiding-in pipe 263 and the hot water guiding-out pipe 264, causing hot water from the engine radiator 3 to flow through the hot water guiding-in pipe 263, the U-tube 643, and the hot water guiding-out pipe 264 and returns to the engine radiator 3 without flowing into the chamber 22 to warm up the inner container 21. Contrarily, when the hot water coil 67 is supplied with a current, the connecting stem 65 is magnetically moved toward the hot water electromagnetic valve 62, as shown in FIG. 4, and brings the sliding block 64 to a position at where the two straight tubes 641, 642 in the sliding block 64 respectively align their one end with the hot water inlet pipe 261 and the hot water outlet pipe 262 and their another end with the hot water guiding-in pipe 263 and the hot water guiding-out pipe 264 and thereby communicate the hot water guiding-in pipe 263 with the hot water inlet pipe 261 and the hot water guiding-out pipe 264 with the hot water outlet pipe 262. Whereby, hot water from the engine radiator 3 may flow through the hot water guiding-in pipe 263, the straight tube 641, and the hot water inlet pipe 261, and into the chamber 22 at the lower part of the inner container 21. Heat in the hot water in the chamber 22 is transmitted via the partition 25 to the inner container 21 for the latter to function like a warmer. And, hot water flowing into the chamber 22 shall pass the hot water outlet pipe 262, the straight tube 642, the hot water guiding-out pipe 264, and returns to the engine radiator 3 to complete one cycle of heating process.

When the connecting stem 65 is moved toward the hot water electromagnetic valve 62, the U-tube 633 in the sliding block 63 of the cool air electromagnetic valve 61 align its two ends with the cool air guiding-in pipe 413 and the cool air guiding-out pipe 414, causing cool air from the air-conditioning compressor 4 to flow through the cool air guiding-in pipe 413, the U-tube 633, and the cool air guiding-out pipe 414 and returns to the compressor 4 without flowing into the flat circulating pipe 5 to refrigerate the inner container 21.

Figure 6:
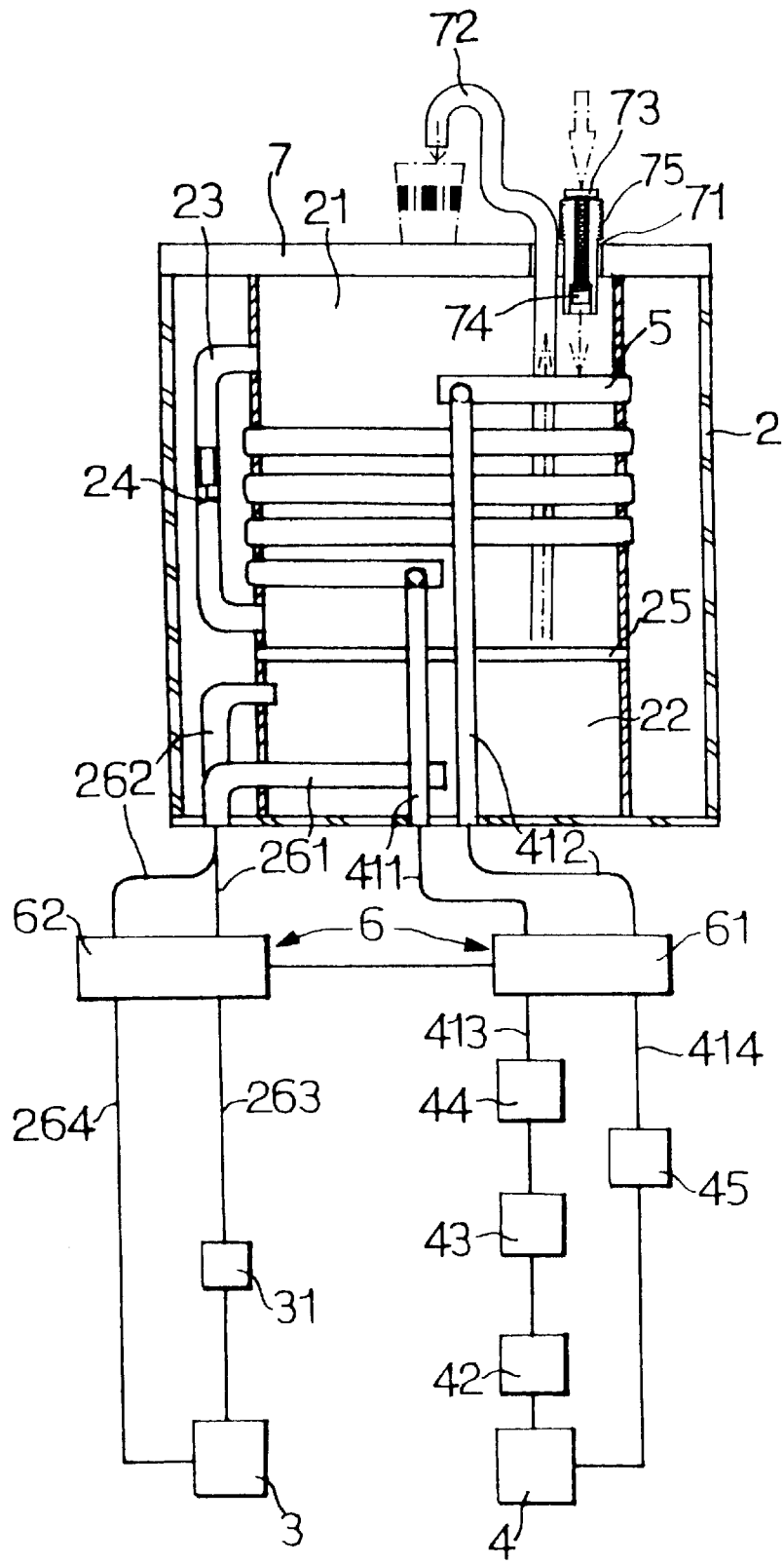
FIG. 6 illustrates the manner in which water pumping means are provided to the present invention for supplying hot or cold drinking water.

Please refer to FIG. 6. The housing 2 is closed with a top cover 7. A spout hole 71 is formed on the cover 7 at a suitable position for a gooseneck spout 72 and a hand-operated air pump 75 having a piston 74 and a push-button head 73 to mount thereto. Cold or hot water stored in the inner container 21 can be pumped to flow out from the spout 72 either through an auxiliary pumping device by turning on a DC 12V electric motor or through the hand-operated air pump 75 by depressing the push-button head 73 to compress air inside the air pump 75 into the inner container 21 via the piston 74. The air compressed into the inner container 21 shall therefore force the cold or hot water in the inner container 21 to flow into the spout 72. The auxiliary pumping device may be a combination of an air pump and a motor or of a set of blades and a motor.

Following are the advantages of the present invention:

1. Only one housing is needed to provide two different functions, that is, refrigerating and heating functions. The flat-type circulating pipe spirally wound about the inner container provides increased contact area of the cool air with the inner container and therefore provides increased thermal conductive area and enhanced efficiency of diffusion of cool air. The chamber provided at lower part of the inner container also provides increased thermal conductive area and enhanced conductivity to enable good hot water circulation for heating the inner container. The provision of the circulating conduit and the cooling fan in the housing further enables even diffusion of the hot or cool air to shorten the time needed to heat or refrigerate the inner container and satisfy the immediate demand for hot or cold drink or food, etc.

2. The control of the present invention over the hot water and cool air pipelines lies in the multi-way flow control valve that consists of a cool air electromagnetic valve and a hot water electromagnetic valve opposite to one another in position. The multi-way flow control valve may be electrically controlled and automatically switched to allow the cool air or the hot water to enter into the housing for refrigerating or heating the inner container. The present invention can be conveniently and actively operated. The cool air coil and the hot water coil in the control valve do not need any further power after the present invention is instantaneously actuated. Power consumption of the refrigerator of the present invention can therefore be largely reduced.

3. The spout hole is formed on the cover of the housing at suitable place for mounting the gooseneck spout and the pumping device, so that hot or cold water stored in the inner container may be conveniently pumped out from the spout for drinking.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A dual-purpose refrigerator for use on an automobile, comprising a housing, an inner container disposed in said housing, a circulating pipe spirally wound about an outer surface of an upper part of said inner container, and a multi-way flow control valve provided between said housing and an engine radiator and an air-conditioning compressor of the automobile; a partition being provided inside said inner container to form a separate water chamber at a lower part of said inner container, said multi-way flow control valve consisting of a cool air electromagnetic valve and a hot water electromagnetic valve opposite to one another and connected together by a connecting stem, a cool air inlet pipe and a cool air outlet pipe being connected at a first end to a lower end and an upper end, respectively, of said spirally wound circulating pipe and at a second end to a first side of said cool air electromagnetic valve, a cool air guiding-in pipe and a cool air guiding-out pipe being connected at a first end to said air-conditioning compressor and at a second end to a second side of said cool air electromagnetic valve corresponding to said cool air inlet pipe and said cool air outlet pipe, a hot water inlet pipe and a hot water outlet pipe being connected at a first end to a lower and an upper portion, respectively, of said water chamber and at a second to a first side of said hot water electromagnetic valve, and a hot water guiding-in pipe and a hot water guiding-out pipe connected at a first end to said engine radiator and at a second end to a second side of said hot water electromagnetic valve corresponding to said hot water inlet pipe and said hot water outlet pipe; whereby, by switching on said hot water electromagnetic valve of said multi-way flow control valve, hot water from said engine radiator of the automobile may flow through said hot water guiding-in pipe and said hot water inlet pipe into said water chamber to heat said inner container for said housing to serve as a warmer, and by switching on said cool air electromagnetic valve of said multi-way flow control valve, cool air from said air-conditioning compressor of the automobile may be guided by said cool air guiding-in pipe and said cool air inlet pipe into said flat-type circulating pipe wound about said inner container to refrigerating said inner container for said housing to serve as a refrigerator.

2. A dual-purpose refrigerator for use on an automobile as claimed in claim 1, wherein a circulating conduit and a fan are provided between said housing and said inner container at suitable positions to speed the diffusion of hot or cold air in said housing to warm up or refrigerate items stored in said inner container.

3. A dual-purpose refrigerator for use on an automobile as claimed in claim 1, wherein said hot water inlet pipe connected to a lower portion of said water chamber of said inner container has an extended length extending into said water chamber to produce a swirling flow in said water chamber to more evenly diffuse heat in the hot water.

4. A dual-purpose refrigerator for use on an automobile as claimed in claim 1, wherein a hot water circulating pump is connected to and between said engine radiator and said hot water electromagnetic valve to directly pump hot water from said engine radiator into said water chamber, so that hot water may enter into said water chamber via the shortest path possible to ensure quick heating of said inner container.

5. A dual-purpose refrigerator for use on an automobile as claimed in claim 1, said circulating pipe spirally wound about said inner container is a flat-type pipe and therefore has increased contact area with said outer surface of said inner container to provide increased thermal conductive area and achieve high efficiency of thermal conduction.

6. A dual-purpose refrigerator for use on an automobile as claimed in claim 1, wherein said cool air electromagnetic valve and said hot water electromagnetic valve respectively have a first and a second sliding block provided in their valve body and said connecting stem is connected at two ends to said first and said second sliding blocks to move them synchronously, said first and said second sliding block each being provided with two straight tube and a U-tube arranged in such a manner that either said two straight tubes or said U-tube will have their ends aligned and communicating with said guiding-in pipes and said guiding-out pipes when said sliding blocks are brought by said connecting stem to a certain place in their respective electromagnetic valve.

7. A dual-purpose refrigerator for use on an automobile as claimed in claim 6, wherein said multi-way flow control valve has a cool air coil and a hot water coil separately provided around said connecting stem at positions outside and close to said cool air electromagnetic valve and said hot water electromagnetic valve, respectively, whereby when said cool air coil or said hot water coil is supplied with a current, said connecting stem is magnetically moved toward said cool air electromagnetic valve or said hot water electromagnetic valve, respectively.

8. A dual-purpose refrigerator for use on an automobile as claimed in claim 7, wherein said connecting stem magnetically moving toward said cool air electromagnetic valve brings said first sliding block in said cool air electromagnetic valve to a position at where said two straight tubes of said first sliding block separately align and communicate with said cool air inlet and said guiding-in pipes and said cool air outlet and said guiding-out pipes, and said second sliding block in said hot water electromagnetic valve to a position at where said U-tube of said second sliding block aligns its two ends with said hot water guiding-in pipe and said hot water guiding-out pipe; and wherein said connecting stem magnetically moving toward said hot water electromagnetic valve brings said second sliding block in said hot water electromagnetic valve to a position at where said two straight tubes of said second sliding block separately align and communicate with said hot water inlet and said guiding-in pipes and said hot water outlet and said guiding-out pipes, and said first sliding block in said cool air electromagnetic valve to a position at where said U-tube of said first sliding block aligns its two ends with said cool air guiding-in pipe and said cool air guiding-out pipe.

9. A dual-purpose refrigerator for use on an automobile as claimed in claim 1, wherein said housing has a top cover, said top cover having a spout hole provided at a selected position for mounting a spout and a hand-operated air pump thereto, said hand-operated air pump including a push-button head connected to a piston, whereby cold or hot water stored in said inner container may be pumped out from said spout for drink by depressing said push-button head of said air pump and thereby compressing air in said piston against water in said inner container to force water into said spout.

10. A dual-purpose refrigerator for use on an automobile as claimed in claim 9, wherein said dual-purpose refrigerator is provided with an auxiliary pumping device operated with a suitable DC motor, said auxiliary pumping device may be selected from the combination of an air pump and a motor or a set of blades and a motor.

* * * * *